(12) United States Patent
French

(10) Patent No.: US 10,947,938 B2
(45) Date of Patent: Mar. 16, 2021

(54) AIR DUCT ASSEMBLY WITH A SECURED SEAL

(71) Applicant: STEERE ENTERPRISES, INC., Tallmadge, OH (US)

(72) Inventor: Douglas French, Stow, OH (US)

(73) Assignee: STEERE ENTERPRISES, INC., Tallmadge, OH (US)

(*) Notice: Subject to any disclaimer, the term of this patent is extended or adjusted under 35 U.S.C. 154(b) by 452 days.

(21) Appl. No.: 16/012,861

(22) Filed: Jun. 20, 2018

(65) Prior Publication Data

US 2018/0372040 A1 Dec. 27, 2018

Related U.S. Application Data

(60) Provisional application No. 62/522,789, filed on Jun. 21, 2017.

(51) Int. Cl.
| | | |
|---|---|---|
| *F16L 17/02* | (2006.01) | |
| *F02M 35/10* | (2006.01) | |
| *F16L 37/12* | (2006.01) | |
| *B29C 45/14* | (2006.01) | |
| *B29C 45/00* | (2006.01) | |
| *F16L 37/14* | (2006.01) | |
| *B29L 31/26* | (2006.01) | |
| *B29L 23/00* | (2006.01) | |

(52) U.S. Cl.
CPC ....... *F02M 35/10354* (2013.01); *B29C 45/00* (2013.01); *B29C 45/1459* (2013.01); *B29C 45/14598* (2013.01); *F02M 35/1036* (2013.01); *F02M 35/10144* (2013.01); *F16L 37/1225* (2013.01); *F16L 37/144* (2013.01); *B29L 2023/22* (2013.01); *B29L 2031/26* (2013.01); *F02M 35/10006* (2013.01)

(58) Field of Classification Search
CPC ......... F16L 17/02; F16L 17/032; F16L 21/02; F16L 37/088; F16L 37/0885
USPC .............. 285/110, 293.1, 321, 347, 374, 400
See application file for complete search history.

(56) References Cited

U.S. PATENT DOCUMENTS 3,645,547 A * 2/1972 Glover .................... F16L 47/10
277/619
3,857,588 A 12/1974 Curtin ............................ 285/31
(Continued)

FOREIGN PATENT DOCUMENTS

| FR | 2 846 069 B1 | 1/2005 | .............. F16L 19/00 |
| FR | 2 808 586 B1 | 4/2005 | ................ F28F 9/26 |
| WO | WO 2012/070944 A1 | 5/2012 | ............... F24H 9/12 |

OTHER PUBLICATIONS

Rubber Material Selection Guide EPDM or Ethylene Propylene, Robinson Rubber Products Company Inc., Aug. 27, 2005, https://web.archive.org/web/20050827002932/http?//www.robinsonrubber.com/pdfs/EPRubber.pdf.

*Primary Examiner* — Aaron M Dunwoody
(74) *Attorney, Agent, or Firm* — Renner Kenner Greive Bobak Taylor & Weber

(57) ABSTRACT

An air duct assembly attachable to a receiving port includes an air duct with an inner surface and an exterior surface connected to one another at a coupling fixture. A seal is connected and bonded to the coupling fixture. The seal extends axially from the coupling fixture and has a tip with an inner diameter smaller than the coupling fixture's inner diameter. A shell is connected to the coupling fixture and the seal. The shell extends axially from the seal and is connectable to the receiving port.

18 Claims, 15 Drawing Sheets

(56) References Cited

U.S. PATENT DOCUMENTS

| | | | | |
|---|---|---|---|---|
| 3,857,589 A | * | 12/1974 | Oostenbrink | F16L 47/10 |
| | | | | 277/615 |
| 4,023,831 A | | 5/1977 | Thompson | 285/31 |
| 4,042,263 A | * | 8/1977 | Harrison | F16L 17/035 |
| | | | | 285/110 |
| 4,124,422 A | * | 11/1978 | Kusano | B29C 57/00 |
| | | | | 156/165 |
| 4,143,884 A | * | 3/1979 | Nicholas | F16L 17/025 |
| | | | | 277/622 |
| 4,344,461 A | * | 8/1982 | Beune | F16L 47/10 |
| | | | | 138/109 |
| 4,468,367 A | * | 8/1984 | Beune | B29C 45/1676 |
| | | | | 264/255 |
| 4,547,005 A | * | 10/1985 | Soederhuyzen | F16L 17/00 |
| | | | | 285/58 |
| 4,553,586 A | | 11/1985 | Lardner | 165/76 |
| 4,566,704 A | * | 1/1986 | van Dongeren | F16J 15/3268 |
| | | | | 277/624 |
| 4,605,248 A | * | 8/1986 | Goldsmith | F16L 58/184 |
| | | | | 285/347 |
| 4,824,148 A | * | 4/1989 | Grabowski | F16L 37/06 |
| | | | | 285/110 |
| 5,062,478 A | | 11/1991 | Potier et al. | 165/178 |
| 5,078,429 A | | 1/1992 | Braut et al. | 285/4 |
| 5,129,685 A | | 7/1992 | Engel | 285/231 |
| 5,209,523 A | | 5/1993 | Godeau | 285/93 |
| 5,271,460 A | | 12/1993 | O'Brien | 165/178 |
| 5,476,290 A | | 12/1995 | Bergmann et al. | 285/110 |
| 5,529,743 A | | 6/1996 | Powell | 264/513 |
| 5,607,190 A | | 3/1997 | Exandier et al. | 285/93 |
| 5,682,924 A | | 11/1997 | Powell | 138/109 |
| 5,901,987 A | | 5/1999 | Godeau | 285/148.19 |
| 6,019,137 A | | 2/2000 | Secher et al. | 138/109 |
| 6,041,824 A | | 3/2000 | Powell | 138/109 |
| 6,135,158 A | | 10/2000 | Kraus | 138/109 |
| 6,398,269 B1 | | 6/2002 | Haussmann | 285/365 |
| 6,454,314 B1 | | 9/2002 | Grosspietsch et al. | 285/319 |
| 6,712,098 B2 | | 3/2004 | Sakazaki et al. | 138/109 |
| 7,562,910 B2 | | 7/2009 | Kertesz et al. | 285/256 |
| 7,597,362 B2 | | 10/2009 | Hartmann | 285/321 |
| 7,770,938 B2 | | 8/2010 | Bauer | 285/305 |
| 7,828,338 B2 | | 11/2010 | Kertesz et al. | 285/365 |
| 7,874,596 B2 | | 1/2011 | Kertesz et al. | 285/417 |
| 8,448,995 B2 | | 5/2013 | Ward | 285/419 |
| 8,740,256 B2 | | 6/2014 | Fansler et al. | 285/93 |
| 8,997,328 B2 | | 4/2015 | Hartmann et al. | F16L 13/147 |
| 9,004,543 B2 | | 4/2015 | Bongiorni et al. | F16L 21/08 |
| 9,103,479 B2 | | 8/2015 | Kertesz et al. | F16L 33/22 |
| 9,175,794 B2 | | 11/2015 | Lewcun | F16L 37/113 |
| 9,188,267 B2 | | 11/2015 | Fansler | F16L 37/088 |
| 9,618,147 B2 | | 4/2017 | Krueger | F16L 23/04 |
| 9,623,594 B2 | | 4/2017 | French et al. | B29C 45/1676 |
| 9,657,878 B2 | | 5/2017 | Hartmann | F16L 37/088 |
| 9,671,053 B2 | | 6/2017 | Eckardt et al. | F16L 53/008 |
| 2009/0230675 A1 | | 9/2009 | Densmore | 285/236 |
| 2010/0301596 A1 | | 12/2010 | Amann et al. | 285/31 |
| 2014/0053939 A1 | | 2/2014 | Kaye et al. | 138/109 |
| 2014/0110010 A1 | | 4/2014 | Ulle | 138/109 |
| 2014/0338773 A1 | | 11/2014 | French | 138/109 |
| 2015/0267849 A1 | | 9/2015 | Henrich et al. | F16L 37/091 |
| 2017/0069992 A1 | | 3/2017 | Hartmann et al. | H01R 13/005 |
| 2017/0074220 A1 | | 3/2017 | Hartmann et al. | F02M 35/1266 |
| 2017/0074430 A1 | | 3/2017 | Hartmann | F16J 17/035 |
| 2017/0122478 A1 | | 5/2017 | Grcic et al. | F16L 55/02754 |
| 2017/0130886 A1 | | 5/2017 | Mann et al. | F16L 53/001 |
| 2017/0146159 A1 | | 5/2017 | Hartmann | F16L 13/147 |

* cited by examiner

AIR DUCT ASSEMBLY WITH A SECURED SEAL

CROSS-REFERENCE TO RELATED APPLICATION

This application claims priority of U.S. Provisional Application Ser. No. 62/522,789 filed Jun. 21, 2017, which is incorporated herein by reference.

TECHNICAL FIELD

Generally, the present invention relates to an automotive clean air duct that connects an automobile engine throttle body to an air filter or other component. In particular, the invention is directed to a duct with a shell that receives a latch to connect the air duct to a receiving port. Specifically, the present invention is directed to an air duct with a secured seal that seals around the receiving port.

BACKGROUND ART

Air ducts of various lengths and sizes are used to transfer clean, filtered air from an air filter through an engine air intake system. It is also well known to use air ducts to transfer cooled or heated air from within the engine compartment to the passenger compartment of an automobile. Air ducts are also widely used in other applications wherever air or any other gas-like substance is transferred between components.

Air ducts have been formed by using a rubber molding process. Although the rubber molded air ducts are effective, they are considered too heavy for use in vehicles requiring lighter weight to improve fuel efficiency. Additionally, rubber molded air ducts are bulky and difficult to mold in the serpentine configurations desired for automobiles which have limited space in the engine compartment.

An alternative to using a one-piece rubber molded air duct is a two-piece construction which utilizes a thermoplastic blow molded tubular body with an injection molded rubber cuff, sometimes called a seal, affixed to an end thereof. Although such a construction works better than the rubber molded ducts, both constructions rely on a hose clamp to circumferentially secure the cuff to a receiving port. Hose clamps are usually constructed from a metal band with a tightening screw wherein the screw is tightened so as to completely secure the cuff to the receiving port. Specifically, the clamp is placed around the area where the cuff and receiving duct or port overlap. The clamp is then tightened to prevent air leakage or entry of dirt into the duct and also prevents the two components from separating during operation of the vehicle. Skilled artisans will appreciate that such a configuration has several drawbacks. First, it is time consuming to assemble the hose clamp, as it requires use of at least a screwdriver or other appropriate tool. Additionally, over-tightening of the clamp and engine vibration may cause the metal band to cut into the cuff which results in cuff tears and eventual leakage or openings in the cuff. Additionally, the metal may corrode over time and ultimately fail, thus rendering the sealed connection broken. Accordingly, there is a need in the art for a clean air duct with a cuff that replaces the hose clamp and which provides a more reliable seal and wherein the air duct and cuff are installed without any tools so as to result in a cost savings in the overall assembly and the assembly process.

One alternative to a rubber molded cuff with a hose clamp includes the use of a rigid cuff material, wherein the cuff is sometimes called a shell, and a metal spring-type clip that latches the shell to a receiving port. To ensure that a seal is obtained between the shell and the receiving port, the shell is typically provided with an internal groove to loosely carry an O-ring or other type of seal that seals around the exterior of the receiving port. This solution presents at least two problems. First, the seal, if properly installed, degrades over time and does not provide an effective seal and, as a result requires replacement. In other words, air is allowed to leak past the seal connection between the duct and the port, diminishing the airflow therethrough. The second problem is that the seal becomes dislodged during installation and then requires re-installation. The various systems employed in such a configuration allow for the seal to be "loose" within the air duct assembly. In other words, the seal can be removed at any point in its life. As a result, each alternative version uses a seal that has its own shape and specific material. Moreover, each alternative version of the duct is of a different shape or kind of material (steel or plastic) and each requires its own way of attaching to the rest of the assembly either by crimping, clamping or plastic spin welding. Although generally effective in their constructions, it is believed that there is a need in the art to provide a better seal configuration used with a latch connector and one which can permanently secure a seal within the shell/duct assembly.

SUMMARY OF THE INVENTION

In light of the foregoing, it is a first aspect of the present invention to provide an air duct assembly with a secured seal.

It is another aspect of the present invention to provide an air duct assembly attachable to a receiving port, comprising an air duct having an inner surface and an exterior surface connected to one another at a coupling fixture, a seal connected and bonded to the coupling fixture, the seal extending axially from the coupling fixture, the seal having a tip with an inner diameter smaller than the coupling fixture's inner diameter, and a shell connected to the coupling fixture and the seal, the shell extending axially from the seal, the shell connectable to the receiving port.

Still another aspect of the present invention is to provide an air duct assembly for transferring air or the like from one component to another, comprising a receiving port having an exterior surface which has a port seal surface and a latch groove, the receiving port having a port opening, a duct having a coupling fixture at an end thereof, the duct having a duct opening alignable with the port opening, a seal bonded to the coupling fixture and extending axially therefrom, the seal having a tip with an inner diameter smaller than an outer diameter of the port seal surface, a shell connected to the coupling fixture and the seal, the shell extending axially from the seal and having lateral openings therethrough, and a latch receivable in the lateral openings which are alignable with the latch groove when the duct is positioned on to the receiving port and wherein the tip seals around the port seal surface.

Yet another aspect of the present invention is to provide a method of forming an air duct connector with a secured seal, comprising forming an air duct with an exterior and an interior surface connected to one another at a coupling fixture, bonding a seal to the coupling fixture so that the seal extends axially from the coupling fixture, wherein the seal has a tip with an inner diameter smaller than a selected interior of the coupling fixture's inner diameter, and attaching a shell to the coupling fixture and the seal, the shell extending axially from the seal.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
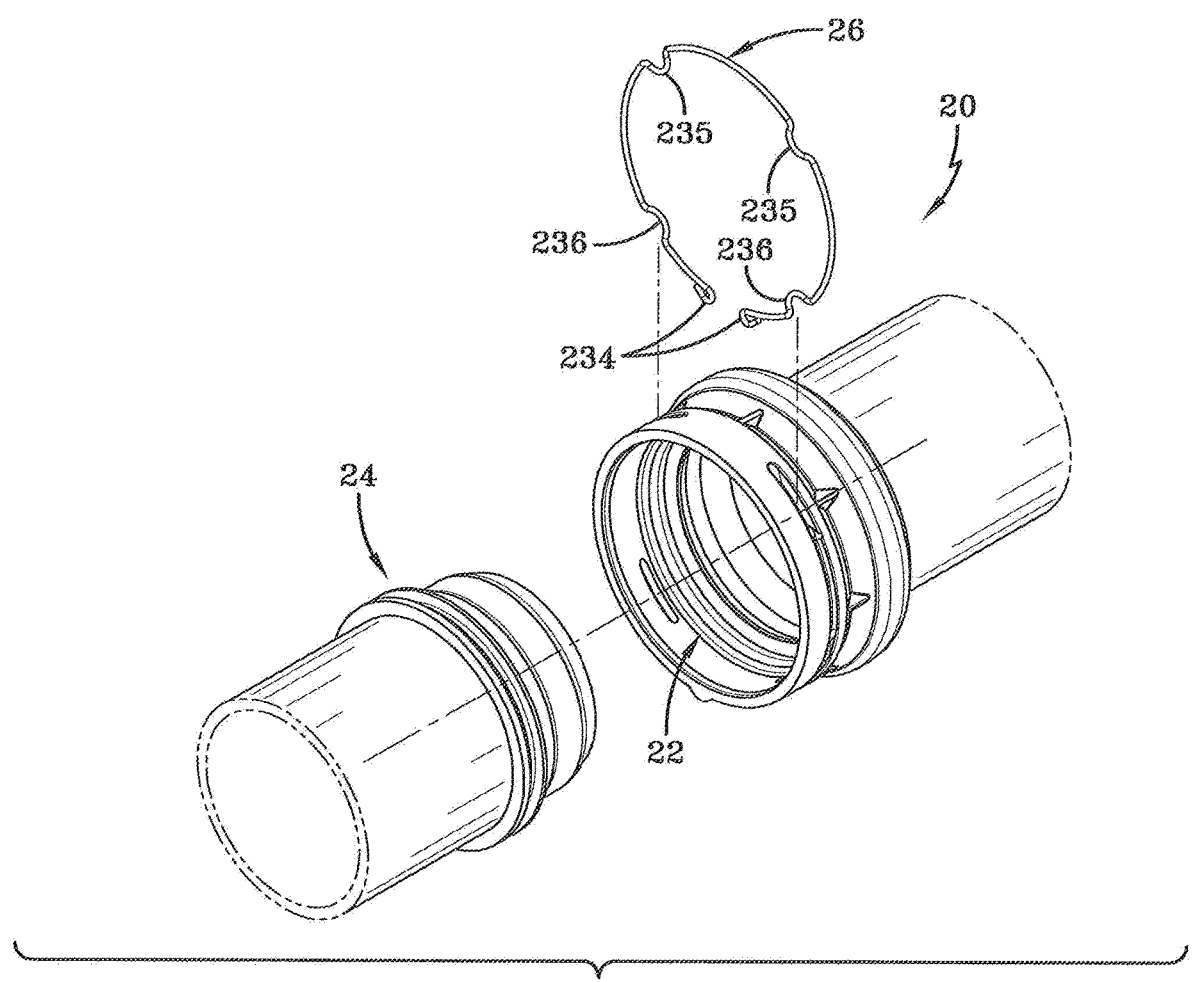
FIG. 1 is an exploded perspective view of an air duct assembly made in accordance with the concepts of the present invention.

With reference to the drawings, and in particular to FIG. 1, it can be seen that an air duct assembly with a secured seal is designated generally by the numeral 20. The assembly 20 has an open end 22 which is receivable on a receiving port 24. In the present embodiment, the port provides a port opening that is axially aligned with the open end 22 wherein the port is connected to an air filter, engine compartment, throttle body, or other similar structure. Although the assembly disclosed herein is used in automobile engine compartments, skilled artisans will appreciate that the duct assembly disclosed herein may be utilized in any environment where air or a gas is transferred from one component to another and in such a way so as to seal the duct interior from external contaminants. More importantly, the duct assembly and associated receiving port are connected to one another while maintaining a secured seal which facilitates a pressurized flow of air or gas therethrough. So as to secure the air duct assembly 20 to the receiving port 24, a latch 26 may be laterally received in the air duct assembly so as to connect the duct assembly 20 to the receiving port 24 as will be described.

Figure 2:
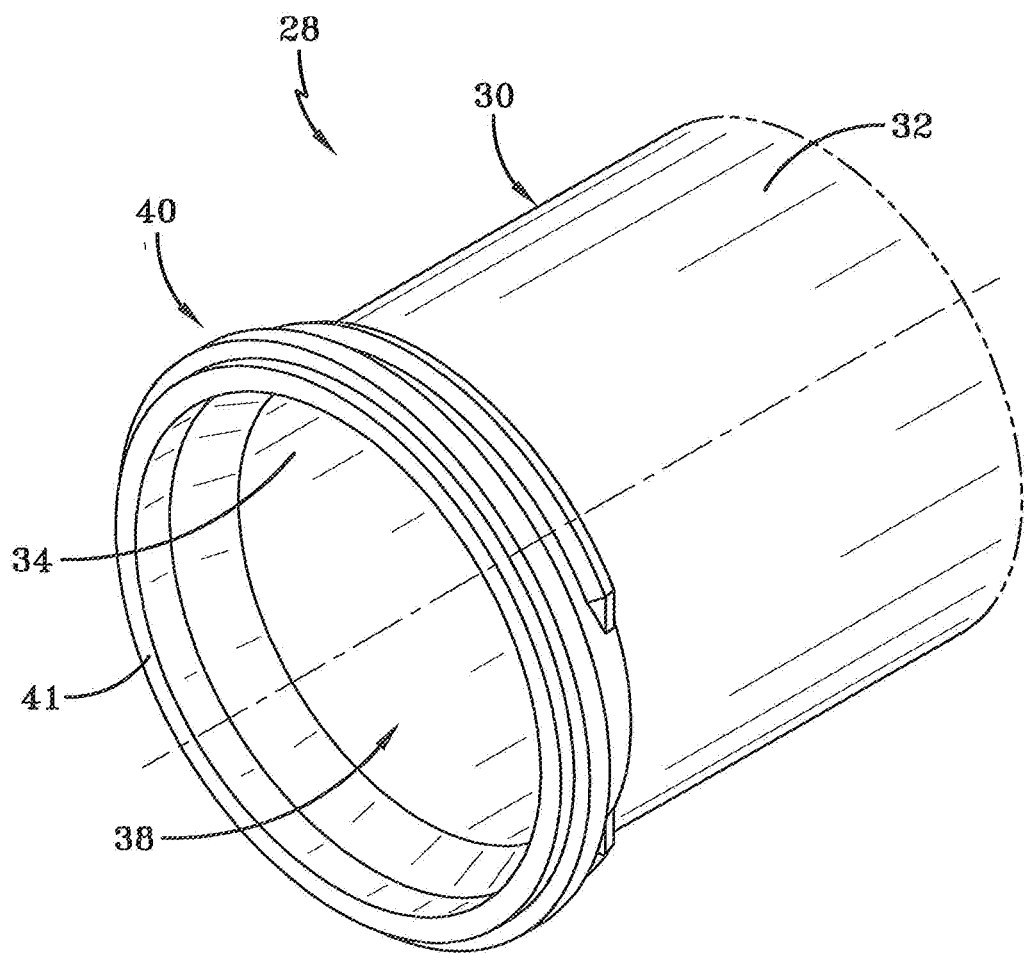
FIG. 2 is a perspective view of a duct utilized in the air duct assembly according to the concepts of the present invention.

As seen in FIG. 2, the duct assembly 20 includes a duct 28, which in most embodiments is manufactured utilizing a blow-molding process. In other embodiments, the duct may be configured by extrusion, injection molding, or additive manufacturing. And in some embodiments, the duct may be straight, curved, curvilinear, or any variation thereof. If a soft enough material is used, the duct may be provided with flexible pleats. The duct may be made from a polymeric material such as polypropylene manufactured by Lyondell Bassel under part number Pro-Fax™ SV152 which has a hardness value of 78 Shore D. Skilled artisans will appreciate that other polymeric materials having similar properties and values may also be utilized. Other suitable materials that could be used for the duct 28 are: nylon manufactured by BASF under the part number Ultramid™ 827G which has a hardness value of 121 Shore R; nylon 6/6 manufactured by DuPont under part number Zytel™ BM70G20HSLX which has a hardness value of 120 Shore R; or thermoplastic elastomer manufactured by Teknor Apex under part number Sarlink™ 4190B which has a hardness value of 90 Shore A. Accordingly, in some embodiments the material used for the duct 28 may have a hardness value ranging anywhere from about 70 Shore A to about 130 Shore R, and in other embodiments from about 90 Shore A to about 121 Shore R.

The duct 28 includes a duct wall 30 with an exterior surface 32 which is opposite an interior surface 34. The interior surface 34 forms an opening 38 which is contiguous with the open end 22 defined by the air duct assembly 20. The duct wall 30 may include a coupling fixture 40 which is formed at an end surface 41 which includes and connects the interior surface 34 to the exterior surface 32. In other words, the coupling fixture 40 is located at an end portion of the duct 28.

Figure 4:
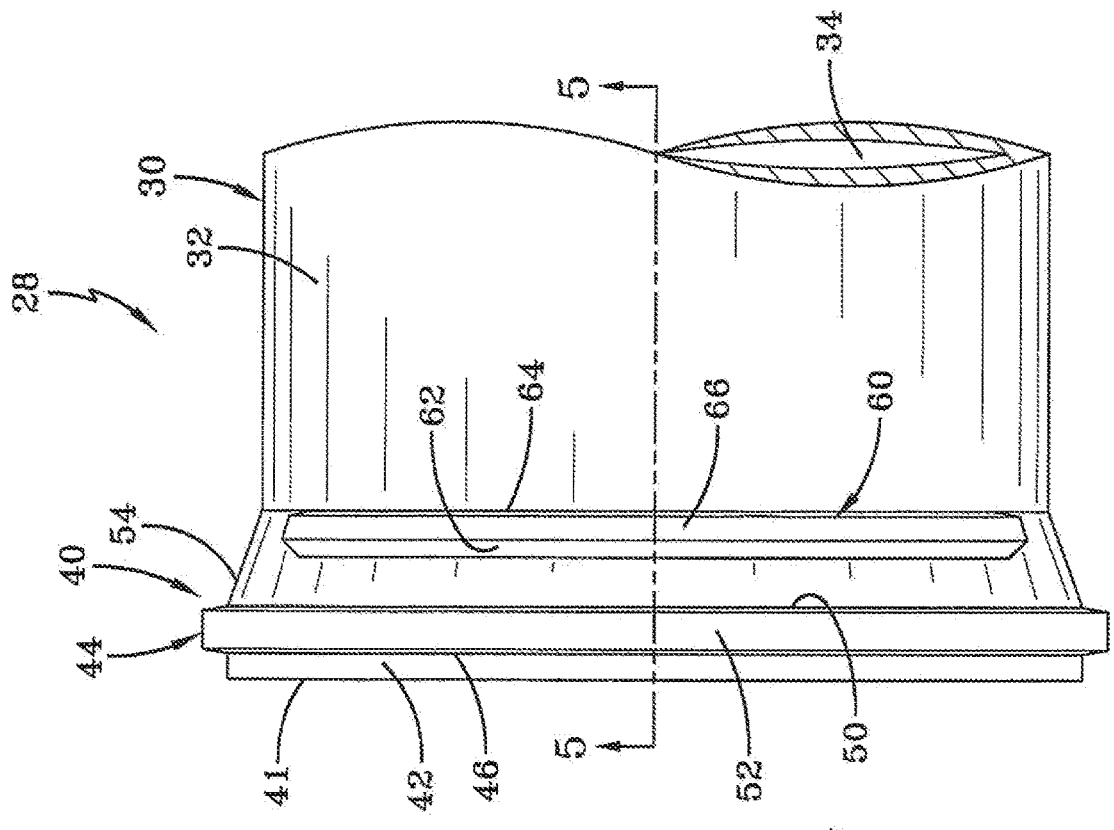
FIG. 4 is a top view of the duct according to the concepts of the present invention.
Figure 3:
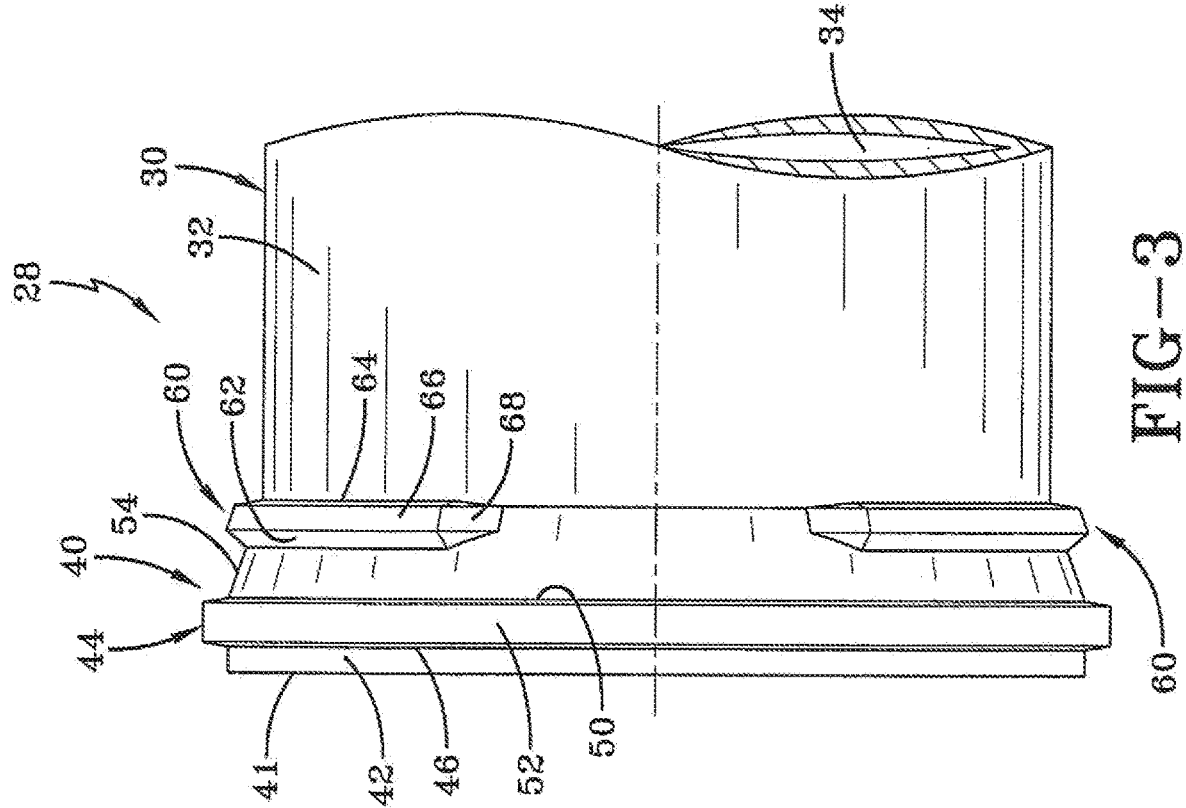
FIG. 3 is a side elevational view of the duct according to the concepts of the present invention.
Figure 5:
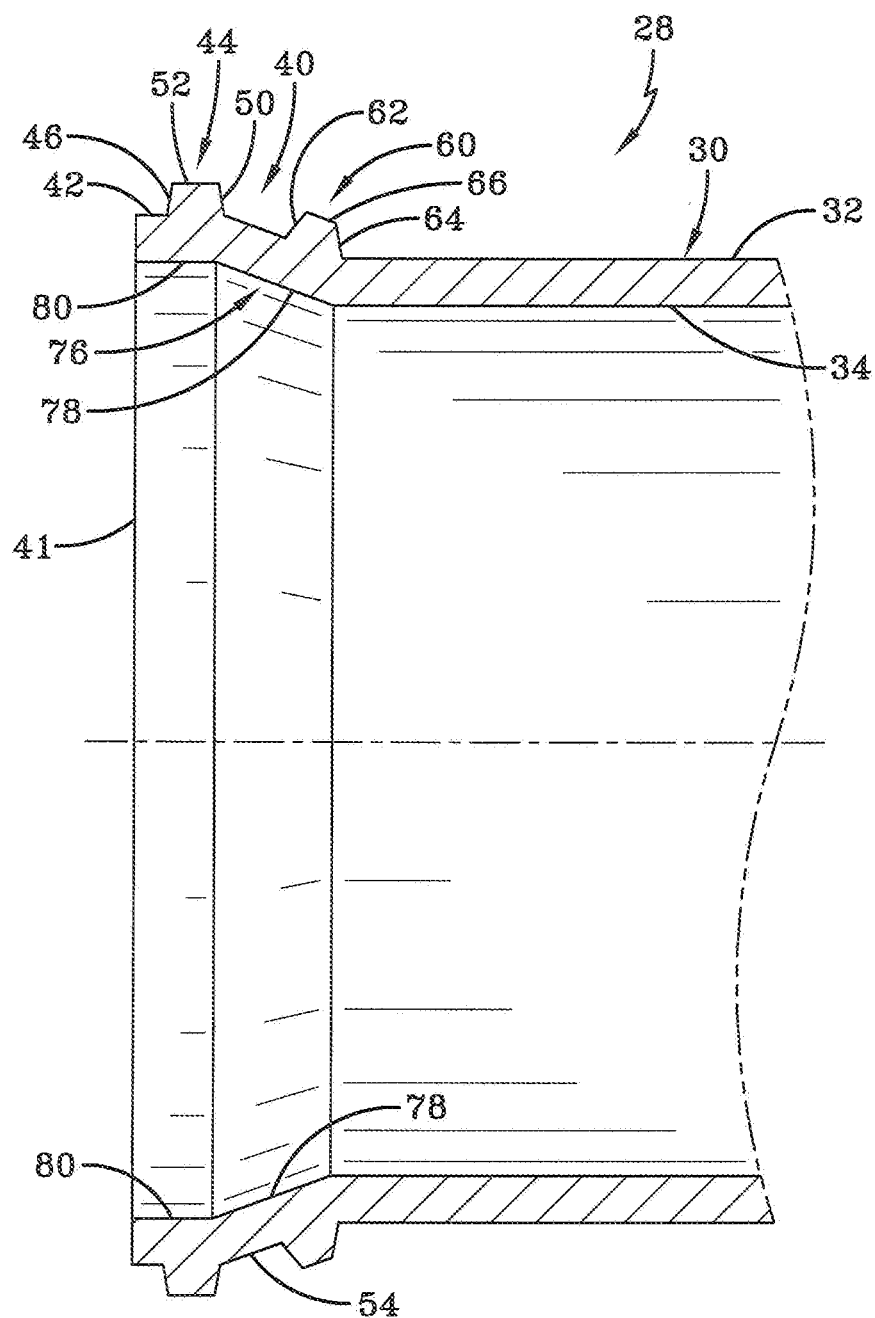
FIG. 5 is a cross-sectional view of the duct taken along lines 5-5 of FIG. 4 and made in accordance with the concepts of the present invention.

As best seen in FIGS. 3-5, the coupling fixture 40 includes an end rim 42 which may extend substantially perpendicularly from the end surface 41 and which may be considered part of the exterior surface 32. A rim collar 44 extends radially outwardly from the end rim 42 and may also be part of the exterior surface 32. In the embodiments shown, the rim collar 44 extends completely around the circumference of the end rim 42 but skilled artisans will appreciate that the rim collar 44 may be segmented. In other words, the rim collar may not be continuous about the circumference of the duct 28.

The rim collar 44 may include a front rim wall 46 which extends substantially perpendicularly from the end rim 42 and a back rim wall 50 which may also extend substantially perpendicularly from the exterior surface 32. In the present embodiment the rim walls 46 and 50 may be somewhat parallel with one another and may be connected to one another by a rim edge 52. In some embodiments, the walls 46 and 50 may extend at angles other than 90° to facilitate overmolding or attachment of other component parts to the duct.

A duct flange 54, which may be part of the coupling fixture 40, extends between the rim collar 44 and the duct wall 30. Specifically, the duct flange 54 may extend from a bottom edge of the back rim wall 50 to the exterior surface 32. The duct flange 54 may extend radially outwardly from the exterior surface 32 at an angle and, as such, may also extend axially therefrom. In the present embodiment, the end rim 42 extends axially from the duct flange 54, wherein the rim collar 44 may be disposed therebetween.

At least one flange rib 60 may extend radially from the duct flange 54 and, in the present embodiment two flange ribs 60 are shown. Skilled artisans will appreciate that the flange rib 60 may extend circumferentially around the duct flange 54 or may be provided in segments as shown in FIGS. 3 and 4. Although only two segments are shown in the drawings, skilled artisans will appreciate that any number of flange ribs may be provided. And in some embodiments the flange rib or ribs 60 may extend outwardly from the exterior surface 32 or some combination of the duct flange 54 and the exterior surface 32. Each flange rib 60 includes a front rib wall 62 which faces the back rim wall 50. The flange rib 60 may also include a back rib wall 64 which may be somewhat parallel with the front rib wall 62 and which extends radially from the exterior surface 32. And in some embodiments, the walls 62 and 64 may extend at an appropriate angle to facilitate overmolding or attachment of other component parts to the duct. A rib edge 66 may connect the front rib wall 62 to the back rib wall 64. In some embodiments a ramp end 68 may extend from each end of the rib edge 66 and the associated walls to the duct flange 54 and/or the exterior surface 38.

As best seen in FIG. 5, the coupling fixture 40 may also provide a coupling fixture interior 76 which is a continuation of the interior surface 34. The coupling fixture interior 76 may include a flange interior 78 which extends radially and axially outward from the interior surface 34. The flange interior 78 may be substantially parallel with the duct flange 54 except for the outwardly extending flange ribs 60. The coupling fixture interior 76 further includes a rim interior 80 which may extend axially from an edge of the flange interior 78. Indeed, the rim interior 80 axially extends from the flange interior 78 to the end surface 41.

Figure 6:
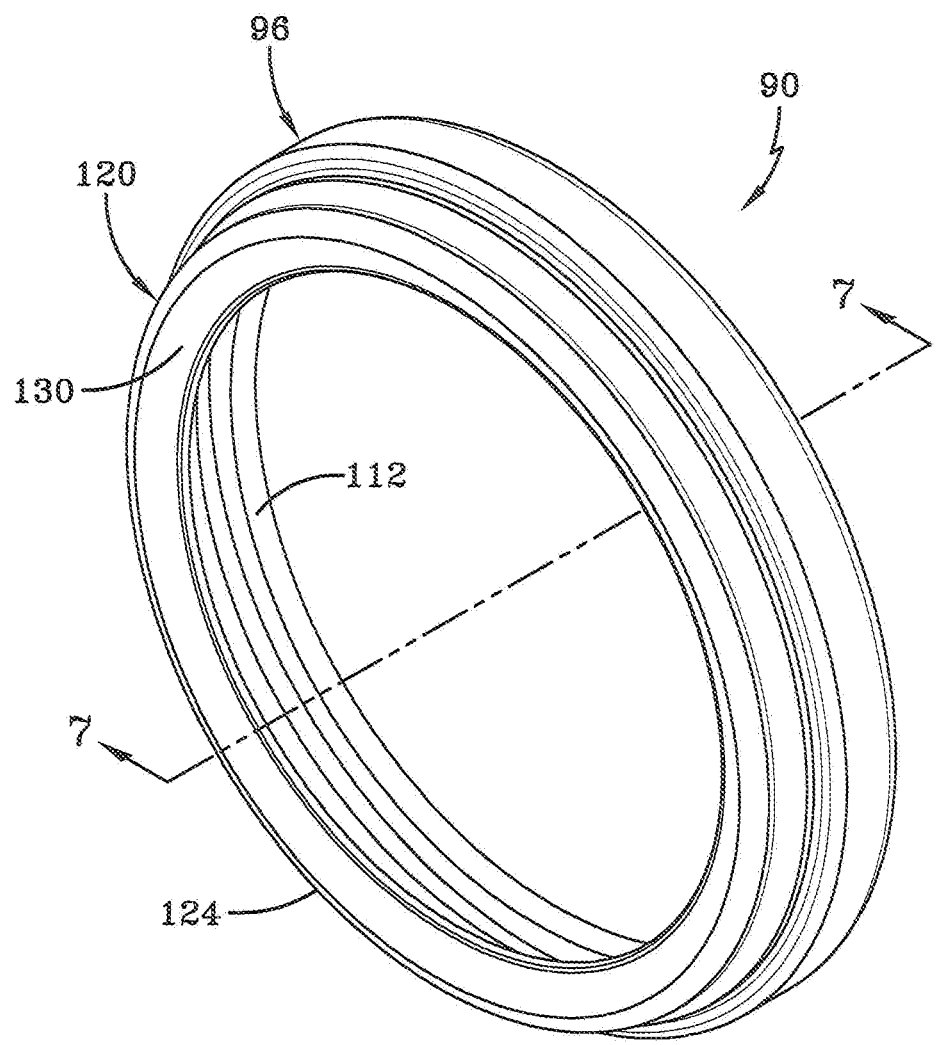
FIG. 6 is a perspective view of a seal used in the air duct assembly according to the concepts of the present invention.
Figure 7:
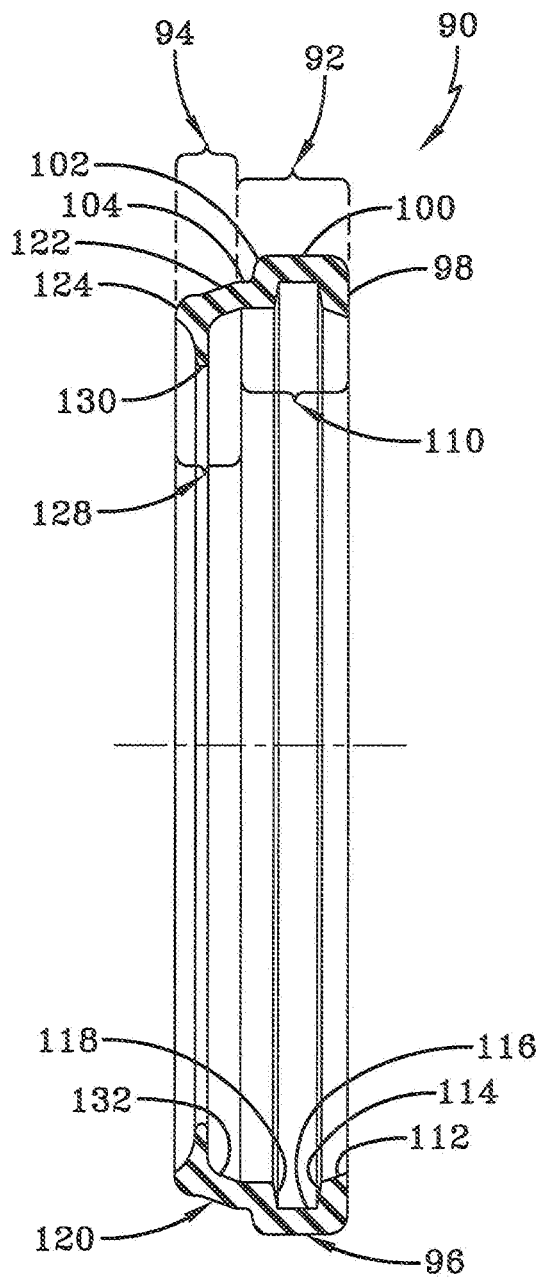
FIG. 7 is a cross-sectional view of the seal taken along lines 7-7 of FIG. 6 according to the concepts of the present invention.
Figure 8:
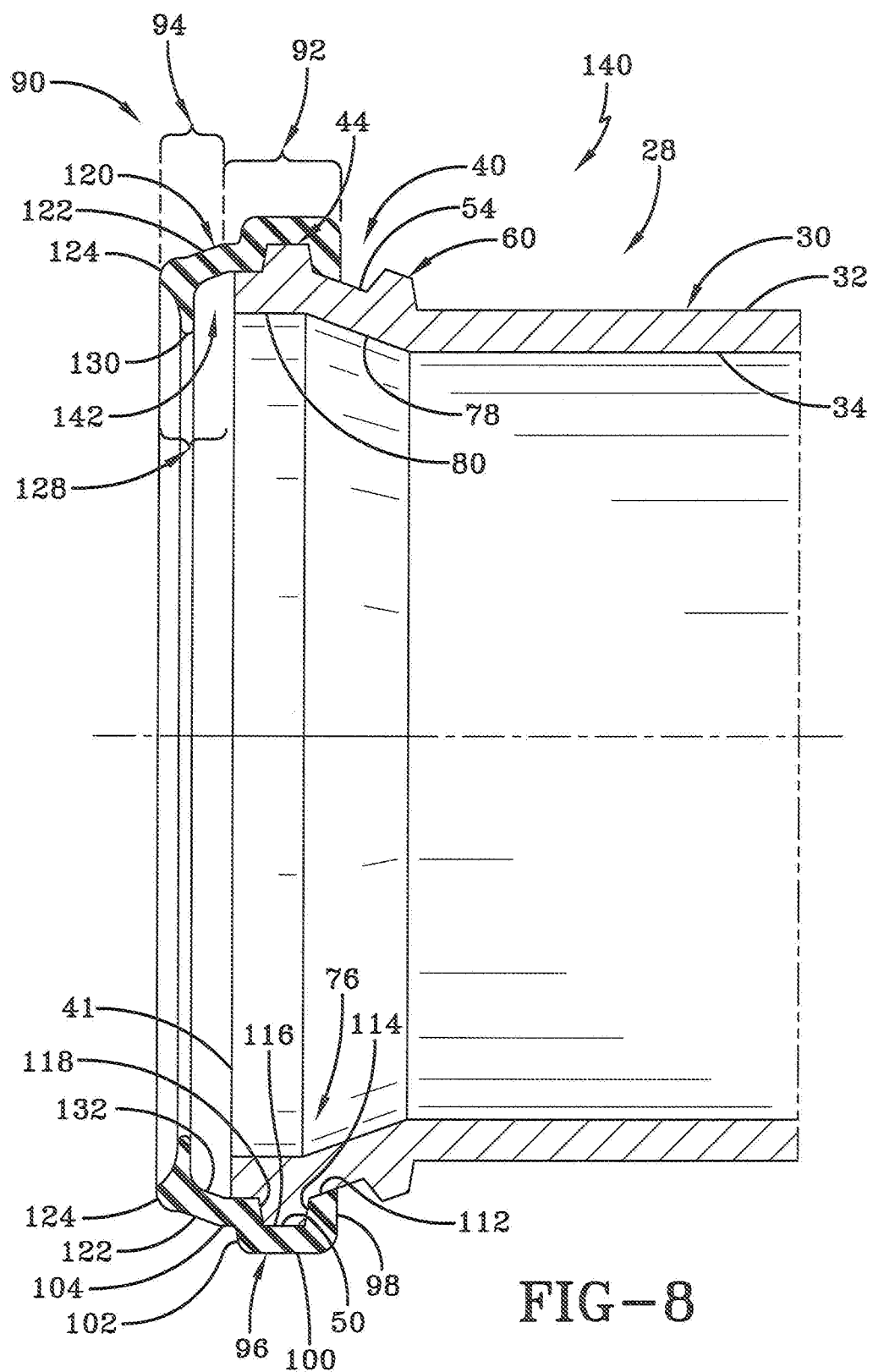
FIG. 8 is a cross-sectional view of a seal-duct sub-assembly showing the seal and the duct bonded and connected to each other according to the concepts of the present invention.
Figure 10:
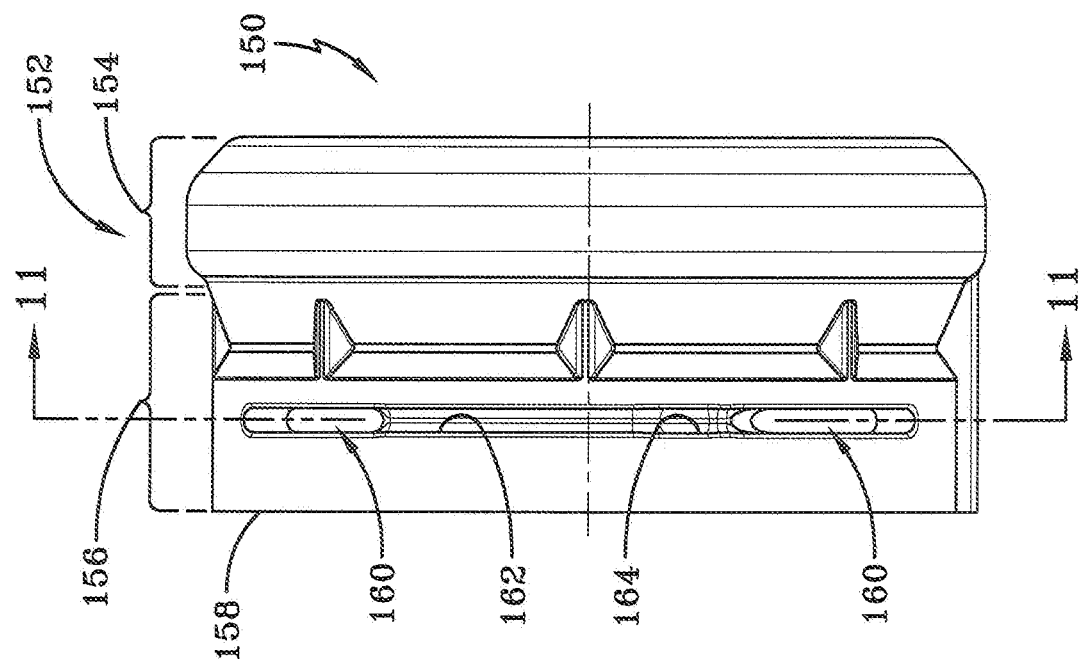
FIG. 10 is a side elevational view of the shell made in accordance with the concepts of the present invention.
Figure 9:
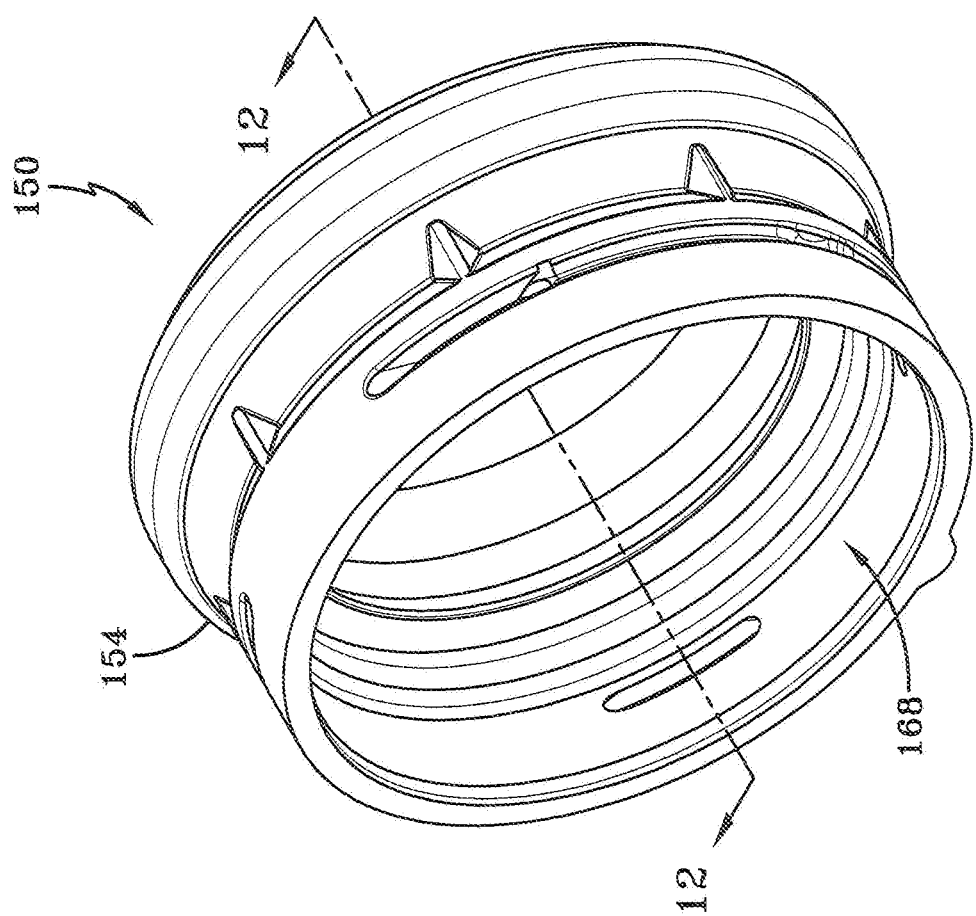
FIG. 9 is a perspective view of a shell utilized in the air duct assembly according to the concepts of the present invention.
Figure 12:
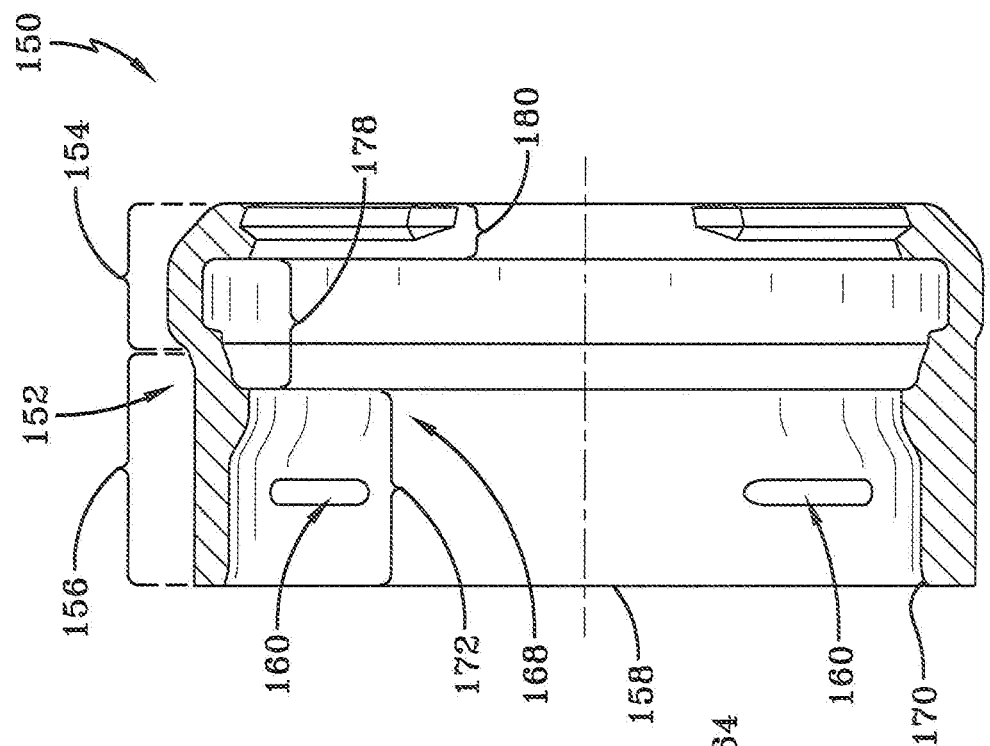
FIG. 12 is a cross-sectional view of the shell taken along lines 12-12 of FIG. 9 in accordance with the concepts of the present invention.
Figure 11:
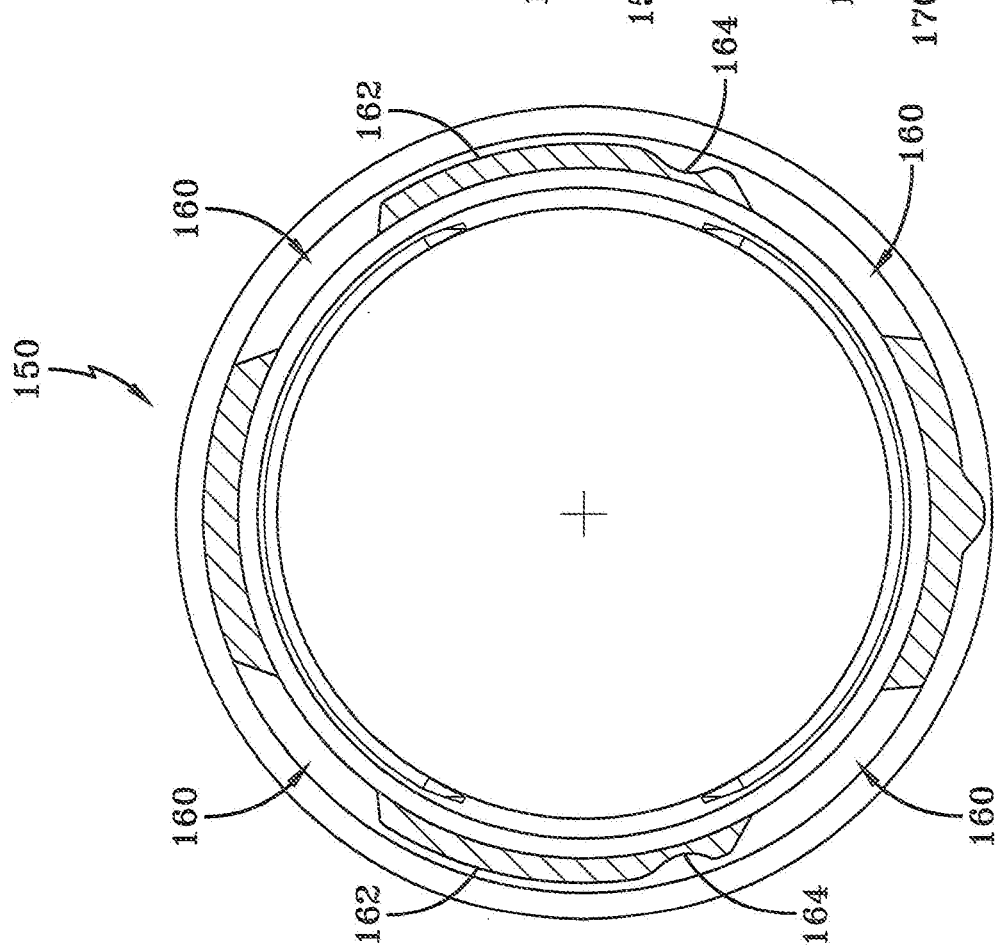
FIG. 11 is a cross-sectional view of the shell taken along lines 11-11 of FIG. 10 in accordance with the concepts of the present invention.

Referring now to FIGS. 6 and 7, a seal is designated generally by the numeral 90. In FIGS. 6 and 7 the seal is shown as a separate piece for description purposes, but as seen in FIG. 8 and as will be described, the seal 90 is overmolded or otherwise connected and bonded to the duct 28. In one embodiment, the seal 90 is overmolded so as to form a mechanical and chemical bond between the seal and the duct 30 and in most embodiments the coupling fixture 40. This is achieved by using a material for the seal which is compatible for bonding with the duct material. In some embodiments, a pre-treatment material such as a primer for bonding may be applied to the duct prior to overmolding to facilitate the bonding of the materials. In such an embodiment, the bond and connection is formed without an adhesive. In the present embodiment, the seal material is selected from a polymeric material and, in particular, a polymeric material which, in most embodiments, is relatively softer than the polymeric material utilized for the duct. In most embodiments, the seal may be made from thermoplastic elastomer which is manufactured by RTP Company under part number RTP™ 6091-65 which has a hardness value of 65 Shore A. Other polymeric materials having similar properties and values may be utilized. Other suitable materials that could be used for the seal are: thermoplastic elastomers manufactured by Exxon Mobile part number Satoprene™ 101-55, which has a hardness value of 55 Shore A, or Santoprene™ 101-64 which has a hardness value of 64 Shore A. Other suitable thermoplastic elastomers are manufactured by Teknor Apex under part numbers Sarlink 4175B, which has a hardness value of 75 Shore A, or Sarlink 4180B which has a hardness value of 80 Shore A. The RTP Company also manufactures thermoplastic elastomers RTP™ 6091-65, which has a hardness value of 65 Shore A, and RTP 6091-85, which has a hardness value of 85 Shore A. A liquid silicone rubber material manufactured by Wacker Chemical under part number LR 3070/60 which has a hardness value of 60 Shore A may also be utilized. Accordingly, in some embodiments, the material used for the seal may have a hardness value ranging anywhere from about 45 Shore A to about 90 Shore A, and in other embodiments from about 55 Shore A to about 80 Shore A.

The seal 90 includes a rim section 92 which may be mechanically and chemically bonded to the duct's end rim 42 and a portion of the duct flange 54. In other words, as best seen in FIG. 8, the rim section 92 may be connected and bonded to a portion of the exterior surface 32 of the coupling fixture 40 but not to the end surface 41. Extending from the rim section 92 is a seal section designated generally by the numeral 94. The seal section 94 extends axially from the rim section 92. It will be appreciated that in the embodiment shown that neither the rim or seal sections are in contact with the end surface 41 or the rim interior 80. In some embodiments, the seal section 94 may extend from a portion of the end surface 41 but not all as it may be desirable to leave a portion of the end surface unconnected to the seal section so as to facilitate the sealing of the assembly 20 to the receiving port 24 as will be discussed.

The rim section 92 includes a rim section exterior 96 which includes an end wall 98 that extends radially outward from the duct flange 54. Extending somewhat perpendicularly from the end wall 98 is a rim surface 100 from which extends radially inward a seal wall 102 which is somewhat parallel with the end wall 98 wherein the rim surface 100 connects the end wall 98 to the seal wall 102. In the embodiment shown, the rim surface 100 may provide rounded or radiused edges between the end wall 98 and the seal wall 102. Extending slightly from a lower edge of the seal wall 102 is a rim step 104 which connects the rim section 92 to the seal section 94.

The rim section 92 also provides for a rim section interior 110, best seen in FIG. 7, which is the surface chemically and mechanically bonded to the corresponding surfaces of the coupling fixture 40. In particular, the rim section interior 110 is bonded and connected to the rim collar 44 and its adjacent surfaces. A flange surface 112 is bonded and connected to the duct flange 54, Extending from the flange surface 112 is a back rim wall surface 114 which is bonded and connected to the back rim wall 50. Extending substantially perpendicularly from the back rim wall surface 114 is a rim edge surface 116 which is bonded and connected to the rim edge 52. The rim section interior 110 may also include a front rim wall surface 118 which extends somewhat perpendicularly from the rim edge surface 116, wherein the surface 118 is bonded and connected to the front rim wall 46.

The seal section 94, which extends from the rim section 92, includes a seal section exterior 120 that extends axially and somewhat radially inward from the rim section exterior 96. The seal section exterior 120 includes a seal ramp 122 which extends from the rim step 104 in a radially inward direction. The seal ramp 122 is connected to a seal shoulder 124 which terminates the distal end of the seal 90. The seal shoulder 124 transitions to a seal section interior 128 that may extend from the rim section interior 110. In the present embodiment, the seal section interior 128 does not make any bonded or mechanical connection to the duct 28. In any event, the seal section interior 128 includes a seal tip 130 which extends radially inwardly from the seal shoulder 124. Extending further from the seal tip 130 is a seal underside 132. As best seen in FIG. 8, the inner diameter of the seal tip 130 is smaller than at least a portion of the inner diameter of the coupling fixture 40 and in particular the rim interior 80. And it will be appreciated that the overmolding of the seal 90 onto the coupling fixture 40, and in particular the end of the duct 28, forms a seal-duct sub-assembly designated generally by the numeral 140. As noted previously, the seal 90 is made of a relatively softer material than the material used to form the duct 28. Importantly, the seal material which is overmolded onto the coupling fixture 40 is mechanically bonded to the coupling fixture 40 by virtue of the rim collar 44. Additionally, the materials are compatible with one another so as to form a chemical and molecularly linked bond/connection between the seal 90 and the coupling fixture 40. As a result, an air-tight seal is formed between the seal 90 and the exterior surface 32 of the duct 28 connected thereto. Between the seal tip 130 and the connection between the seal 90 and the duct 28, a tip cavity, designated generally by the numeral 142, is formed. The tip cavity 142 is situated between the seal tip 130, the seal underside 132 and the end surface 41 of the duct 28. As will be described in detail below, engagement of the seal tip 130 by the receiving port 24 deflects the seal tip 130 into the tip cavity 142 and provides a seal around the receiving port.

Figure 13:
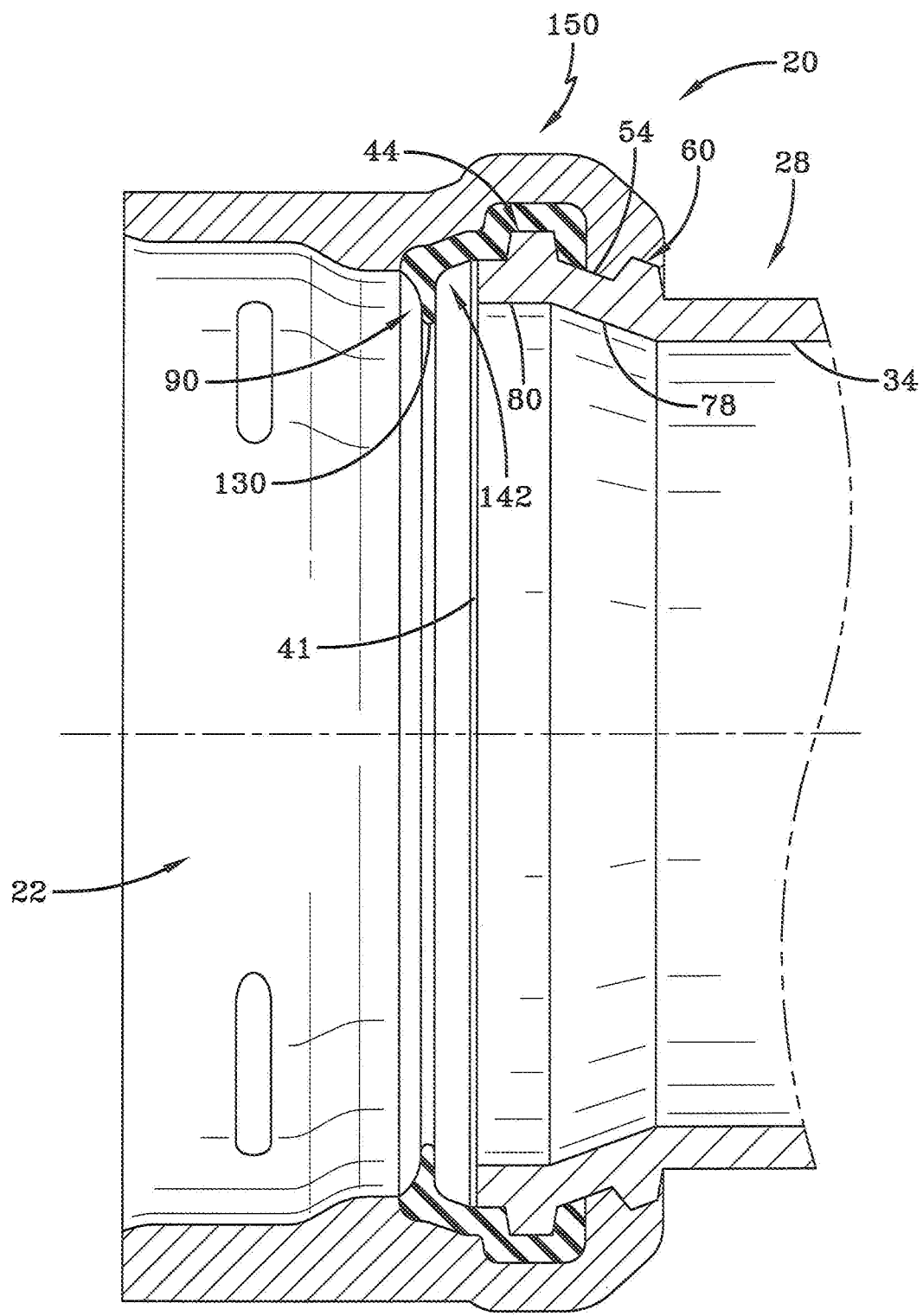
FIG. 13 is a cross-sectional view of the air duct assembly showing the shell bonded and connected to both the seal and the duct in accordance with the concepts of the present invention.

Referring now to FIGS. 9-13, it can be seen that a shell is designated generally by the numeral 150. As best seen in FIGS. 9-12, the shell is shown as a separate piece so as to allow for description of its component parts while FIG. 13 shows the shell 150 connected to the seal-duct sub-assembly 140. The shell 150 is overmolded onto the seal-duct sub-assembly 140 with a material that is substantially rigid with a hardness similar to that used for the duct 28. Indeed, the material used may be any one of the materials mentioned in regard to the manufacture of the duct 28. The shell 150 is overmolded onto the sub-assembly 140 so as to form at least a mechanical bond to the duct 28 and the seal 90. In any event, the shell 150 extends radially outward and axially from the seal section exterior 120, the rim section exterior 96, and the coupling fixture 40.

The shell 150 includes a shell exterior surface 152 which extends from the duct 28 and, in particular, the flange rib or ribs 60. It will further be appreciated that the shell 150 has an inner diameter which may be greater than the inner diameter of the seal tip 130, the duct inner surface 80, the flange interior surface 78, and the interior surface 34.

The shell exterior surface 152 includes a shell body 154 from which extends a shell latching section 156 that has a reduced diameter from the shell body 154. The shell latching section 156 includes a shell end 158. The shell latching section 156 may provide lateral openings 160 wherein a shell groove 162 may be provided between adjacent lateral openings 160. Each shell groove 162 may further provide holding detents 164. As will be described, the openings 160, the groove 162 and detents 164 are employed to receive the latch 26.

Figure 14:
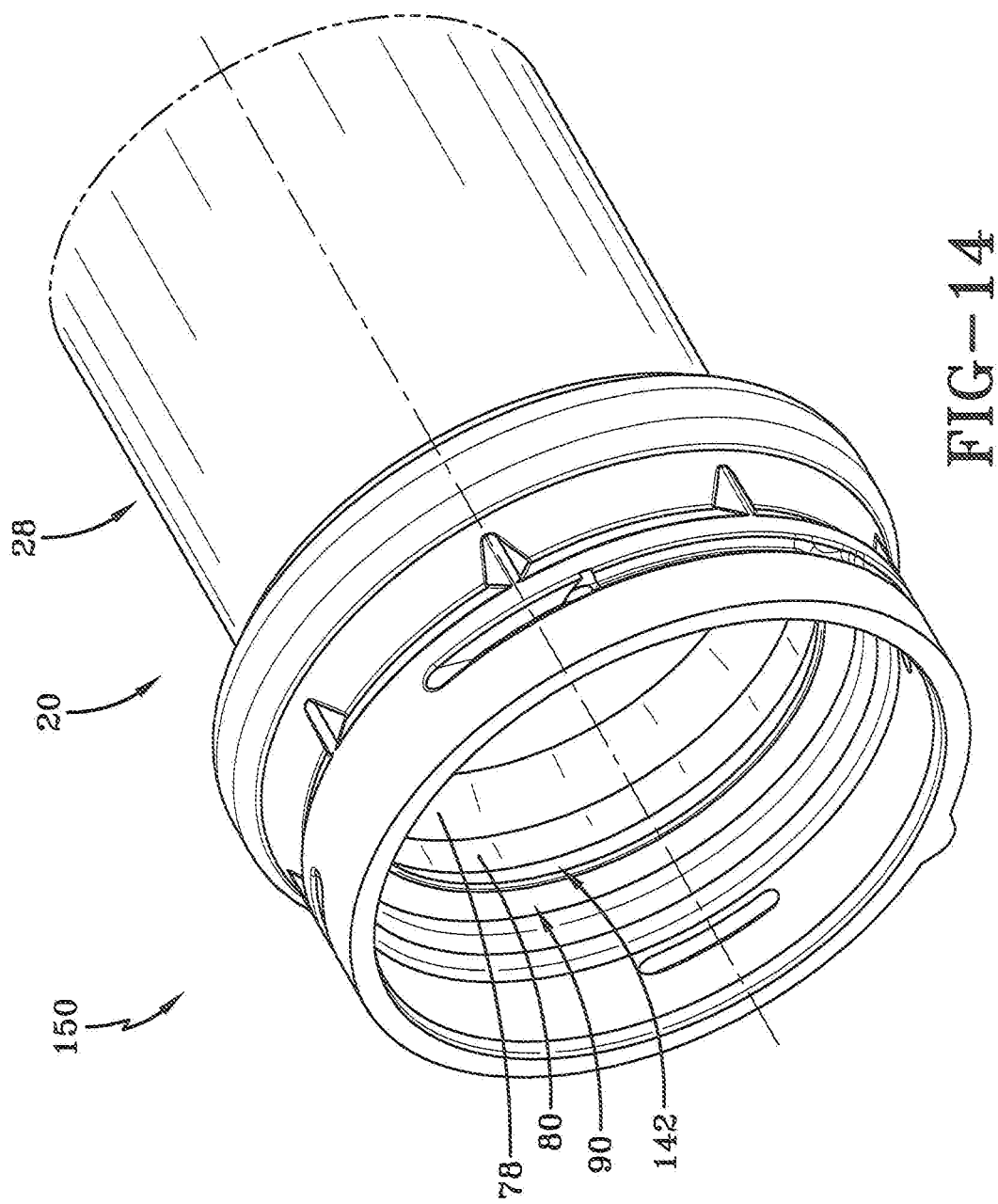
FIG. 14 is a perspective view of the air duct assembly without a latch made in accordance with the concepts of the present invention.

The shell 150 may further include a shell interior surface 168 which extends inwardly from the shell end 158 and which is somewhat parallel with the shell exterior surface 152. The shell interior surface 168 includes a chamfer 170 which extends inwardly from the shell end 158. Further extending from the chamfer 170 is a port facing surface 172 which is received around the receiving port 24, as will be discussed. Further extending axially inwardly from the surface 172 is a seal surface 178 which is formed during the shell molding process and which matches the seal section exterior 120. Further extending from the seal surface 178 is a duct surface 180 which matches the rim section exterior 96 of the coupling fixture 40. In particular, the duct surface 180 matches and conforms around the sealing ribs 60. As best seen in FIGS. 13 and 14, the overmolding or other attachment mechanism of the shell 150 onto the seal-duct assembly 140 forms the air duct assembly 20.

Figure 16:
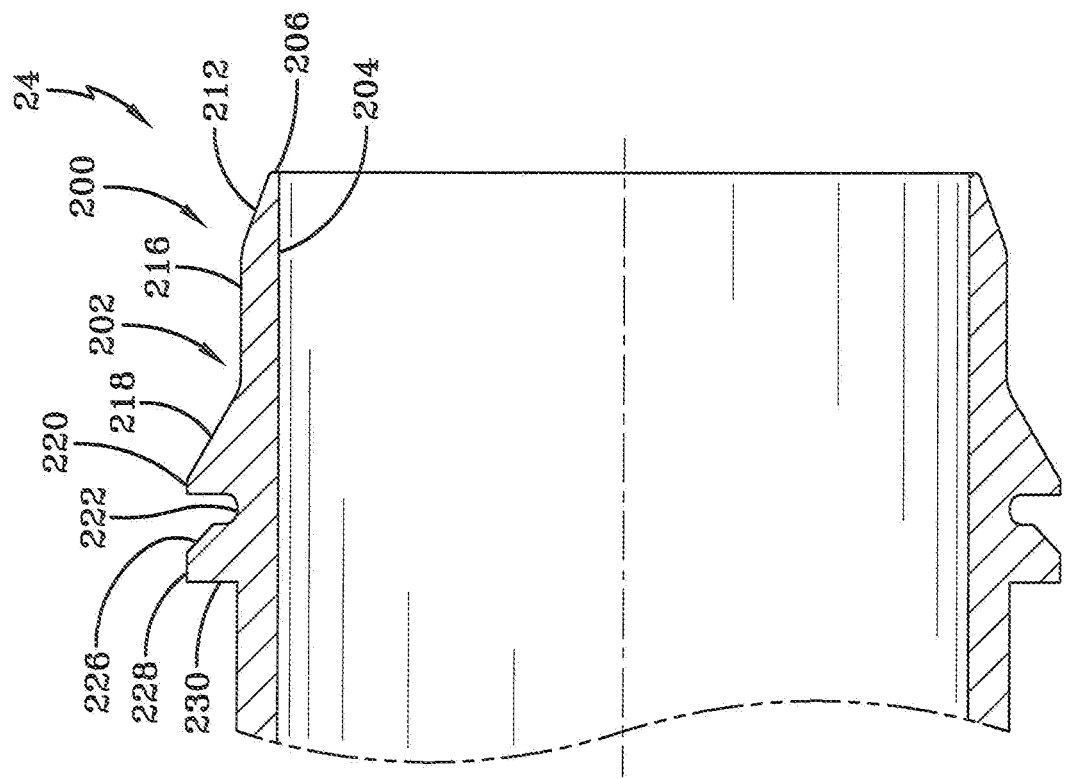
FIG. 16 is a cross-sectional view of the receiving port made in accordance with the concepts of the present invention.
Figure 15:
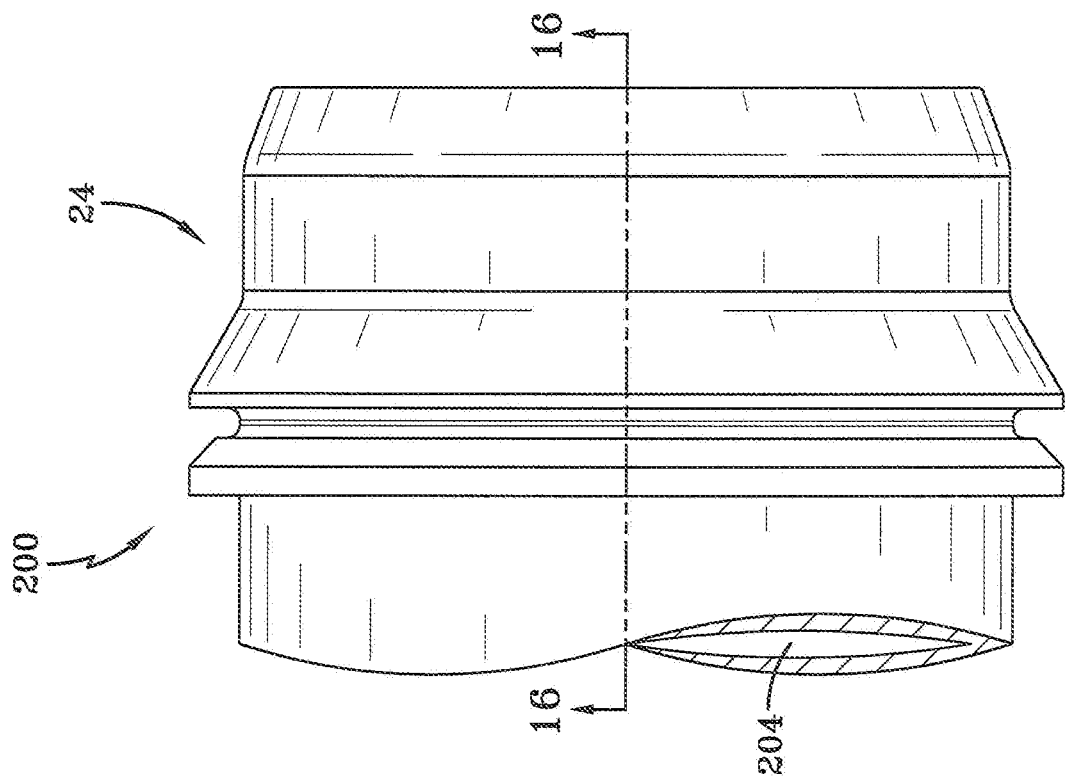
FIG. 15 is a side elevational view of a receiving port which fits into an open end of the air duct assembly according to the concepts of the present invention.

Referring now to FIGS. 15 and 16, the receiving port 24 is shown. The receiving port 24 includes a port body 200 which has an exterior surface 202, which is received in the assembly 20 and an interior surface 204 which is substantially aligned with and sized to substantially match the diameter or shape of the duct interior surface 34. A port end 206 connects the exterior surface 202 to the interior surface 204. The exterior surface 202 includes an angular entry surface 212 which extends from the end 206. With reference to FIGS. 15-18, it will be appreciated that the angular entry surface 212 may be complementary to the flange interior 78 of the coupling fixture 40. In other words, the entry surface 212 provides a close fit and may be frictionally engaged with the flange interior 78 but they may not form an air-tight seal therebetween. Extending axially from the entry surface 212 is a port seal surface 216, a portion of which matches the rim interior 80 and a further portion which is engaged by the seal tip 130. It will be appreciated that the seal tip has an inner diameter that is smaller than an outer diameter of the port seal surface.

Extending angularly from the port seal surface 216 is a port ramp 218 which is angled in such a way so as to match at least a portion of the port facing surface 172. Further extending from the port ramp 218 is a ramp ledge 220 from which radially inwardly extends a latch groove 222 wherein the groove 222 aligns with the latch openings 160 when the assembly 20 is received on the port 24, and wherein the latch groove 222 may extend 360° around the circumference of the exterior surface 202. Extending on a side of the latch groove 222 opposite the ramp ledge 220 is a groove ramp 226 which transitions into a ramp platform 228 which matches the shell inner diameter, and in particular, the port facing surface 172. The ramp platform 228 terminates at a wall surface 230 which extends inwardly to the exterior surface 202.

Figure 19:
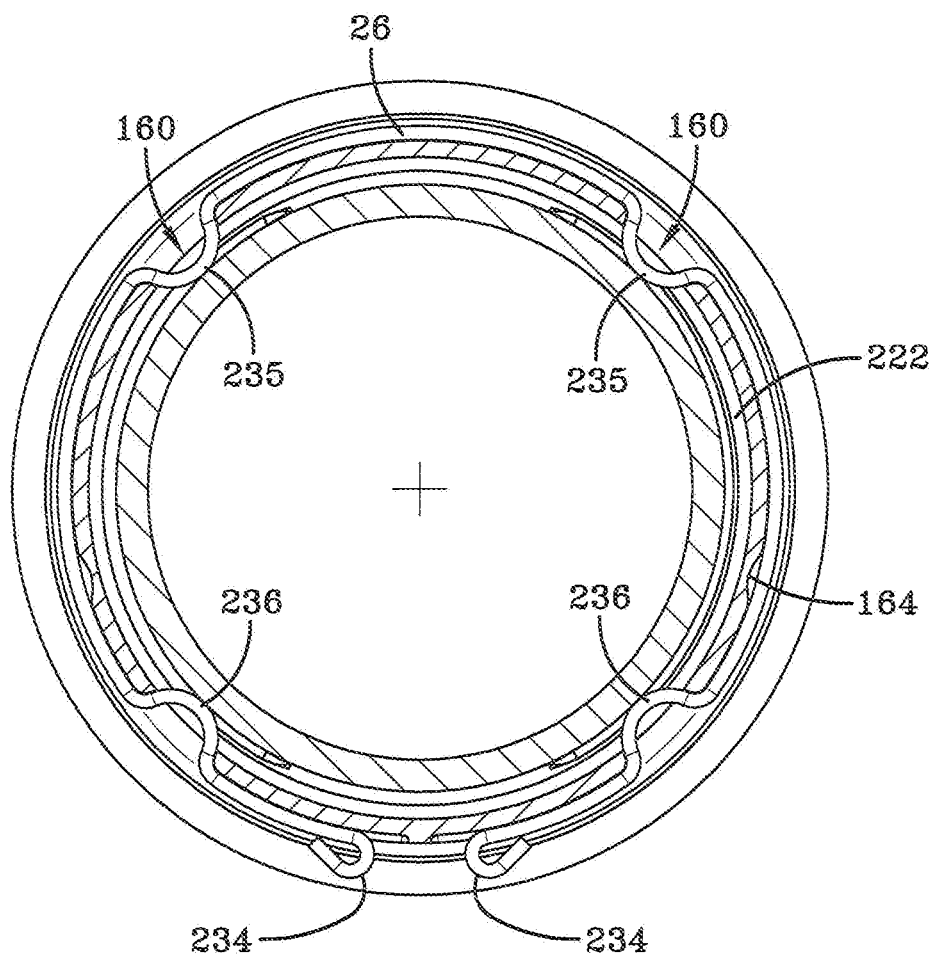
FIG. 19 is a cross-sectional view of the assembled air duct assembly latched onto the receiving port taken along lines 19-19 of FIG. 18 according to the concepts of the present invention.

As best seen in FIGS. 1 and 19, the latch 26 includes opposed end tabs 234. The latch, which is made of a wire material that provides spring-like properties, also includes body tabs 235 and 236 which are dimensionally removed from the end tabs 234, wherein the end tabs 234 may be slidably received in the shell groove 162 and wherein they may be received in the holding detents 164 until such time that the air duct assembly 20 is fully received onto the receiving port body 200.

Figure 17:
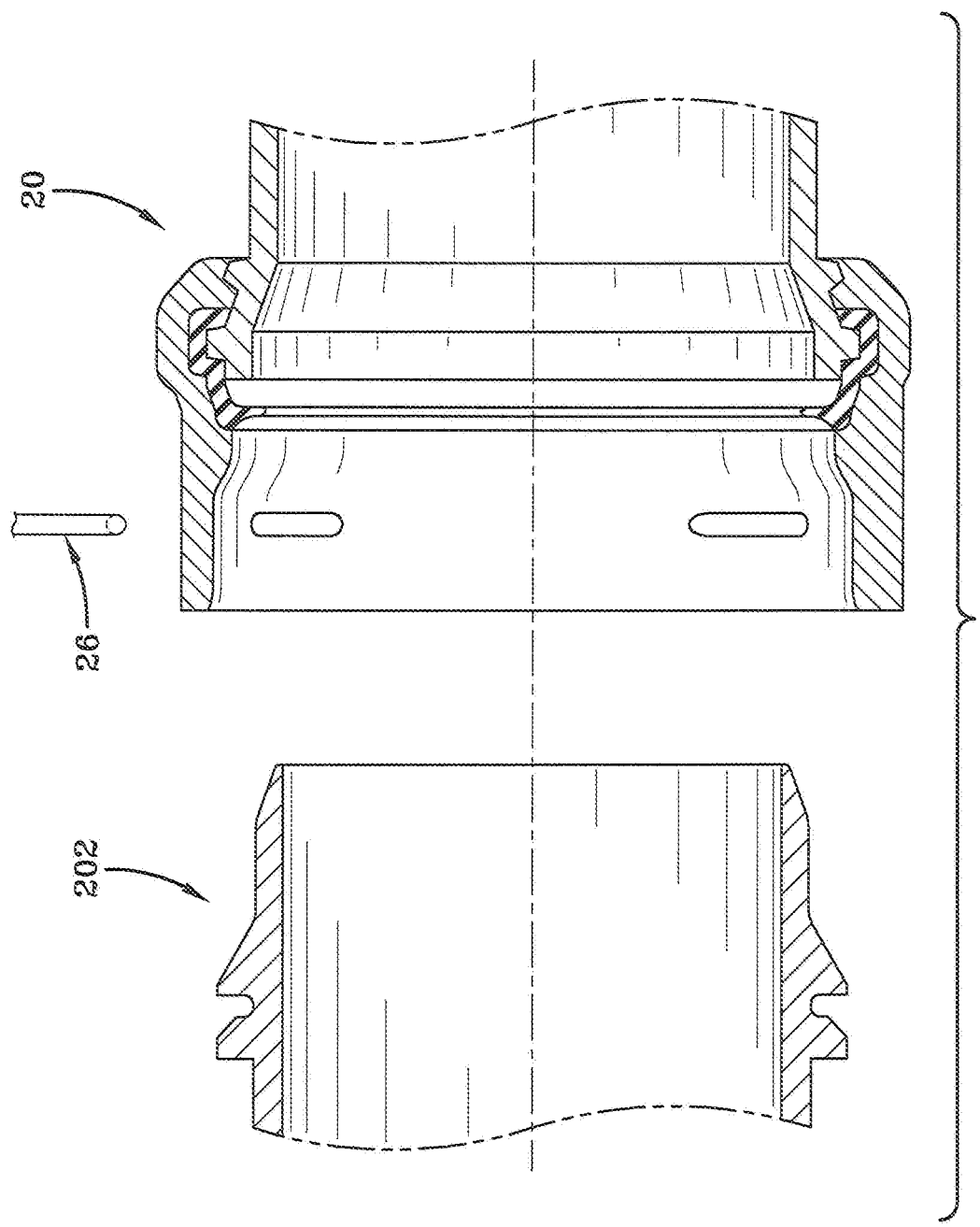
FIG. 17 is an assembly view, in cross-section, of the air duct assembly, a partial view of the latch, and the receiving port made in accordance with the concepts of the present invention.
Figure 18:
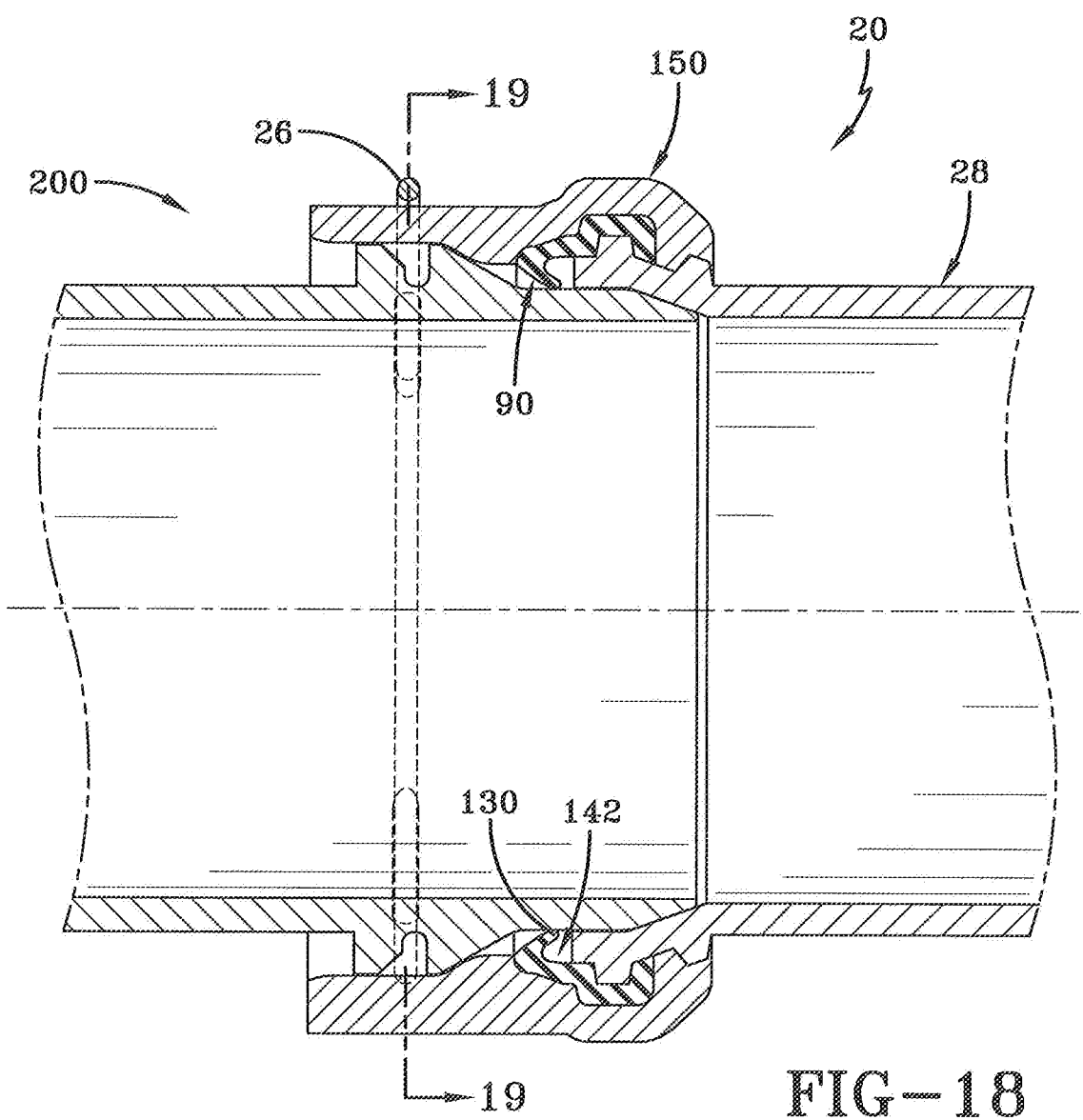
FIG. 18 is a cross-sectional view of the air duct assembly assembled to the receiving port with the latch in accordance with the concepts of the present invention.

As best seen in FIGS. 17 and 18, the assembly 20 is alignable with the receiving port 24. The latch 26 may be held in the detents until such time that the assembly 20 is fully received on the receiving port 24. Insertion of the duct assembly 20 onto the receiving port causes the angular entry surface 212 to initially engage the seal tip 130. Once the angular entry surface 212 fully engages the flange interior 78, the seal tip 130 seals around the circumference of the port seal surface 216 and the tip is deflected inwardly into the tip cavity 142. As a result, the seal tip 130 provides an air-tight seal around the receiving port and in particular the port seal surface 216 so as to provide a fluid air-tight connection between the receiving port and the duct assembly. Once in position, the latch 26 may be deflected such that the body tabs 235 and 236 are received in the latch groove 222. This provides a secure mechanical connection between the duct assembly 20 and the receiving port 24. Whenever it is desired to remove the duct assembly from the receiving port, the latch 26 is radially and outwardly deflected and the assembly can be separated from the port.

The present embodiment is advantageous in that the seal 90 is positively captured between the exterior of the duct and the interior of the shell. Moreover, the seal 90 is mechanically and chemically bonded to at least the exterior surface of the coupling fixture 40. And the shell is at least mechanically coupled to both the duct assembly and the seal. This is advantageous over the prior art constructions in which the seal is loosely placed and not positively retained as there is no chemical bond between the duct and seal. A further advantage of the present configuration is that the seal tip 132 is allowed to be deflected into the tip cavity to allow for adjustments to vibrations without total compression of the seal. As a result, the seal tip is not repeatedly compressed in such a way that it is allowed to deteriorate. This has been found to extend the life of the seal and, thus, improve operation of the duct assembly when connected to the receiving port. Moreover, the mechanical latch 26 allows for absorption of a majority of the axial and radial stresses applied to the duct assembly and the receiving port while permitting the seal 90 to simply function as a seal without requiring the seal to function as a connecting feature between the two parts.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An air duct assembly attachable to a receiving port, comprising:
    an air duct having an inner surface and an exterior surface connected to one another at a coupling fixture;
    a seal connected and bonded to said coupling fixture, said seal extending axially from said coupling fixture, said seal having a tip with an inner diameter smaller than said coupling fixture's inner diameter; and
    a shell connected to said coupling fixture and said seal, said shell extending axially from said seal, said shell connectable to the receiving port.

2. The assembly according to claim 1, wherein said coupling fixture comprises a rim collar extending radially outwardly from said exterior surface, said seal encapsulating said rim collar.

3. The assembly according to claim 2, further comprising:
    an end surface connecting said exterior surface to said interior surface at said coupling fixture, said seal extending radially and axially from said exterior surface, said tip and said end surface forming a tip cavity therebetween.

4. The assembly according to claim 3, wherein said air duct has an opening defined by said interior surface, and wherein the receiving port is partially received into said opening and deflects said tip into said tip cavity so as to seal around the receiving port.

5. The assembly according to claim 2, wherein said coupling fixture further comprises at least one flange rib extending radially outwardly from said exterior surface, said shell encapsulating said at least one flange rib and a section of said seal.

6. The assembly according to claim 5, wherein said coupling fixture further comprises a duct flange extending between said rim collar and said at least one flange rib, wherein said duct flange extends radially outward from said exterior surface.

7. The assembly according to claim 6, wherein said shell extends axially and radially from said seal, said shell having lateral openings therethrough to receive a latch which detachably connects said shell to the receiving port.

8. The assembly according to claim 1, wherein said seal is captured between said coupling fixture and said shell and extends therefrom so as to seal around the receiving port.

9. An air duct assembly for transferring air or the like from one component to another, comprising:
    a receiving port having an exterior surface which has a port seal surface and a latch groove, said receiving port having a port opening;
    a duct having a coupling fixture at an end thereof, said duct having a duct opening alignable with said port opening;
    a seal bonded to said coupling fixture and extending axially therefrom, said seal having a tip with an inner diameter smaller than an outer diameter of said port seal surface;
    a shell connected to said coupling fixture and said seal, said shell extending axially from said seal and having lateral openings therethrough; and
    a latch receivable in said lateral openings which are alignable with said latch groove when said duct is positioned on to said receiving port and wherein said tip seals around said port seal surface.

10. The air duct assembly according to claim 9, wherein said coupling fixture comprises:
    at least one flange rib extending radially outward from said exterior surface; and
    a rim collar extending radially outward from said exterior surface.

11. The air duct assembly according to claim 10, wherein said seal is connected to and encapsulates said rim collar, and wherein said shell is connected to and encapsulates said at least one flange rib such that said seal is secured between said shell and said coupling fixture.

12. The air duct according to claim 11, wherein said duct has an interior surface and an exterior surface connected to one another by an end surface, said seal extending axially and radially from said exterior surface, said tip and said end surface forming a tip cavity therebetween, wherein said tip is deflected into said tip cavity when engaged by said port seal surface.

13. The air duct according to claim 10, wherein said coupling fixture further comprises a duct flange extending radially outward from an exterior surface of said duct, said at least one flange rib and said rim collar extending from said duct flange.

14. The air duct according to claim 9, wherein said duct has an interior surface and an exterior surface connected to one another by an end surface, said seal extending axially and radially from said exterior surface, said tip and said end surface forming a tip cavity therebetween, wherein said tip is deflected into said tip cavity when engaged by said port seal surface.

15. A method of forming an air duct connector with a secured seal, comprising:
   forming an air duct with an exterior and an interior surface connected to one another at a coupling fixture;
   bonding a seal to said coupling fixture so that said seal extends axially from said coupling fixture, wherein said seal has a tip with an inner diameter smaller than a selected interior of said coupling fixture's inner diameter; and
   attaching a shell to said coupling fixture and said seal, said shell extending axially from said seal.

16. The method according to claim 15, further comprising:
   overmolding said seal to said coupling fixture so as to form a mechanical and chemical bond therebetween.

17. The method according to claim 16, further comprising:
   overmolding said shell on to said seal and said shell so as to form a mechanical bond to both.

18. The method according to claim 15, further comprising:
   forming a tip cavity between said tip and said coupling fixture.

* * * * *